(12) United States Patent
Sudbrink et al.

(10) Patent No.: US 10,420,271 B2
(45) Date of Patent: Sep. 24, 2019

(54) FULLY ADJUSTABLE LIFT SYSTEM

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 498 days.

(21) Appl. No.: 15/148,561

(22) Filed: May 6, 2016

(65) Prior Publication Data
US 2016/0249521 A1 Sep. 1, 2016

Related U.S. Application Data

(63) Continuation-in-part of application No. 14/537,206, filed on Nov. 10, 2014, now Pat. No. 9,801,323.

(51) Int. Cl.
*A01B 63/22* (2006.01)
*A01B 19/02* (2006.01)
(Continued)

(52) U.S. Cl.
CPC .............. *A01B 63/22* (2013.01); *A01B 19/02* (2013.01); *A01B 73/044* (2013.01); *F16H 21/44* (2013.01); *Y10T 74/20* (2015.01)

(58) Field of Classification Search
CPC .................................................. A01B 63/22
(Continued)

(56) References Cited

U.S. PATENT DOCUMENTS 356,631 A 1/1887 Frichette
1,136,043 A 4/1915 Olson
(Continued)

FOREIGN PATENT DOCUMENTS

CA 2 289 240 A1 5/2000
GB 833670 4/1960
(Continued)

OTHER PUBLICATIONS

"Electro-hydraulic tillage depth control system for rotary implements mounted on agricultural tractor Design and response experiments of control system", Jeyong Lee, M. Yamazaki, A. Oida, H. Nakashima, H. Shimizu, Journal of Terramechanics 35, 1998, pp. 229-238 (10 pages).

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A lift and gauge wheel lift mechanism has a hydraulic lift cylinder pivotally connected to a lift mechanism rocker link. A rear lift wheel link is pivotally connected to the lift mechanism rocker link. The rear lift wheel link is pivotally connected to either a rear lift wheel arm having at least one rear lift wheel attached. A gauge wheel link is pivotally connected to the lift mechanism rocker link. The gauge wheel link is pivotally connected to a gauge wheel parallel arm bell crank. The gauge wheel parallel arm bell crank is attached to either a gauge wheel upper parallel arm, or to a gauge wheel lower parallel arm. At least one front gauge wheel is connected to the gauge wheel upper parallel arm and to the gauge wheel lower parallel arm.

19 Claims, 9 Drawing Sheets

(51) Int. Cl.
*A01B 73/04* (2006.01)
*F16H 21/44* (2006.01)

(58) Field of Classification Search
USPC .................................................. 172/400
See application file for complete search history.

(56) References Cited

U.S. PATENT DOCUMENTS

| | | | |
|---|---|---|---|
| 1,412,950 A | 4/1922 | McCoy | |
| 2,723,129 A * | 11/1955 | Sprague | A01B 31/00 172/239 |
| 2,968,356 A * | 1/1961 | Mydels | A01B 3/26 172/395 |
| 3,091,476 A | 5/1963 | Blake | |
| 3,700,041 A | 10/1972 | Ryan | |
| 3,777,823 A | 12/1973 | Holfeld | |
| 3,908,345 A | 9/1975 | Oni et al. | |
| 4,026,365 A | 5/1977 | Andersson et al. | |
| 4,119,329 A | 10/1978 | Smith | |
| 4,176,721 A | 12/1979 | Poggemiller et al. | |
| 4,273,196 A | 6/1981 | Etsusaki et al. | |
| 4,301,871 A | 11/1981 | van der Lely et al. | |
| 4,317,489 A | 3/1982 | Steinbach | |
| 4,355,688 A | 10/1982 | Hamm et al. | |
| 4,359,105 A | 11/1982 | Van Natta | |
| 4,600,060 A | 7/1986 | Winter et al. | |
| 4,655,296 A | 4/1987 | Bourgault | |
| 4,878,543 A | 11/1989 | Kauss | |
| 4,944,355 A | 7/1990 | Karchewski | |
| 5,009,270 A | 4/1991 | Vangsgard | |
| 5,156,482 A * | 10/1992 | Owings | B63H 9/10 403/315 |
| 5,163,518 A | 11/1992 | Foley | |
| 5,234,060 A | 8/1993 | Carter | |
| 5,409,069 A | 4/1995 | Hake | |
| 5,427,184 A | 6/1995 | Peck | |
| 5,538,266 A | 7/1996 | Martin et al. | |
| 5,562,167 A | 10/1996 | Honey | |
| 5,573,072 A | 11/1996 | Evans et al. | |
| 5,660,237 A | 8/1997 | Boyko et al. | |
| 5,771,978 A | 6/1998 | Davidson et al. | |
| 5,957,218 A | 9/1999 | Noonan et al. | |
| 6,089,327 A | 7/2000 | Kimura et al. | |
| 6,112,145 A | 8/2000 | Zachman | |
| 6,112,827 A | 9/2000 | Reiber et al. | |
| 6,144,910 A | 11/2000 | Scarlett et al. | |
| 6,220,366 B1 | 4/2001 | Noonan et al. | |
| 6,305,478 B1 | 10/2001 | Friggstad | |
| 6,367,589 B1 | 4/2002 | Lausch et al. | |
| 6,374,921 B1 | 4/2002 | Friggstad | |
| 6,397,953 B1 | 6/2002 | Ankenman | |
| 6,401,832 B1 | 6/2002 | Payen | |
| 6,547,012 B2 | 4/2003 | Scarlett et al. | |
| 6,679,339 B1 | 1/2004 | Steinlage et al. | |
| 6,786,130 B2 | 9/2004 | Steinlage et al. | |
| 6,935,253 B2 | 8/2005 | Murray et al. | |
| 7,063,167 B1 | 6/2006 | Staszak et al. | |
| 7,142,956 B2 | 11/2006 | Heiniger et al. | |
| 7,204,319 B2 | 4/2007 | Hoehn et al. | |
| 7,513,316 B2 | 4/2009 | Ruckle et al. | |
| 7,540,332 B2 | 6/2009 | Friggstad et al. | |
| 7,588,088 B2 | 9/2009 | Zachman | |
| 7,766,093 B2 | 8/2010 | Becker et al. | |
| 7,970,519 B2 | 6/2011 | Green | |
| 8,127,861 B2 * | 3/2012 | Meek | A01B 73/065 172/311 |
| 8,235,133 B2 | 8/2012 | Friggstad | |
| 8,352,121 B2 | 1/2013 | Bitter | |
| 8,359,988 B2 | 1/2013 | Bassett | |
| 9,801,323 B2 * | 10/2017 | Sudbrink et al. | A01B 63/22 |
| 9,924,621 B2 * | 3/2018 | Sudbrink et al. | A01B 3/26 |
| 2004/0016556 A1 | 1/2004 | Barber | |
| 2006/0021235 A1 | 2/2006 | Becker | |
| 2007/0068238 A1 | 3/2007 | Wendte | |
| 2008/0267719 A1 | 10/2008 | Corcoran | |
| 2012/0048159 A1 | 3/2012 | Adams et al. | |
| 2012/0048160 A1 | 3/2012 | Adams et al. | |
| 2012/0215410 A1 | 8/2012 | McClure et al. | |
| 2012/0227992 A1 | 9/2012 | Henry | |
| 2012/0261145 A1 | 10/2012 | Palen | |
| 2012/0261146 A1 | 10/2012 | Bolten | |
| 2012/0305321 A1 | 12/2012 | Wagger | |
| 2013/0032363 A1 | 2/2013 | Curry et al. | |
| 2015/0129259 A1 | 5/2015 | Sudbrink et al. | |

FOREIGN PATENT DOCUMENTS

| | | |
|---|---|---|
| WO | 03/000028 A1 | 1/2003 |
| WO | 2013/026661 A1 | 2/2013 |

\* cited by examiner

FULLY ADJUSTABLE LIFT SYSTEM

CROSS REFERENCE TO RELATED APPLICATIONS

This is a continuation-in-part of U.S. patent application Ser. No. 14/537,206, entitled "ROCKER LINK LIFT SYSTEM", filed Nov. 10, 2014, which is incorporated herein by reference.

BACKGROUND OF THE INVENTION

1. Field of the Invention

The present invention relates to agricultural implements, and, more particularly, to lift mechanisms for agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing proper conditions for planting of a crop. Grass or residual crop material disposed on top of the soil is also worked into the seedbed so that it does not interfere with a seeding implement subsequently passing through the seedbed.

Tillage implements prepare the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks. Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement on road and between fields, and for depth control of the tillage implements in the field. When the wheels are used for depth control, in other words for controlling the height of the tillage implement above the ground surface in operation, often main lift wheels are used to control the height of the implement. Gauge wheels are then used to control the front to back levelling of the tillage implement. Because tillage implements are generally too wide to travel on roads between fields, tillage implements may be operable to fold up into a folded transport configuration. In this case, portions or wings of the framework that carries the field working devices, such as cultivator shanks, are folded for transport and unfolded for use in the field. The prior art includes various arrangements of main lift wheels, gauge wheels, and mechanisms for actuating them.

However, such prior art main lift wheel and gauge wheel lift mechanisms typically provide front to back and side to side levelling control and adjustability using individual lift cylinders for each lift wheel and gauge wheel. This requires complicated and expensive hydraulic valves, circuitry, and controls. Further, operation and control of such prior art lift mechanisms is often cumbersome and time consuming, requiring extensive operator training and knowledge. Alternately, prior art lift mechanisms minimize the number of cylinders involved, but at the expense of front to back and side to side levelling control and adjustability.

What is needed in the art is a lift and gauge wheel lift mechanism that is simple, reliable, strong, and stable. What is further needed in the art is a lift and gauge wheel lift mechanism that makes minimal use of hydraulic valves, cylinders, and controls, yet provides for simple front to back and side to side levelling control and adjustability.

SUMMARY OF THE INVENTION

Embodiments of the present invention provide a lift and gauge wheel lift mechanism for an agricultural or industrial implement having a center section and/or folding wing sections. A set of center frame rear lift wheels is operable to raise and lower the center frame section of the agricultural or industrial implement, and the entire agricultural or industrial implement when it is in the folded transport configuration. Wing frame rear lift wheels are operable to raise and lower the wing frame section or sections of the agricultural or industrial implement. Center frame front gauge wheels are used for fore and aft, or front and rear, levelling of the center frame section. Wing frame front gauge wheels are used for fore and aft levelling of the wing frame section. In order to accomplish this with minimum use of hydraulics, lift and gauge wheel lift mechanisms are provided that each use a single hydraulic lift cylinder for each rear lift wheel and gauge wheel set.

Each hydraulic lift cylinder is pivotally connected to a lift mechanism rocker link. Each hydraulic lift cylinder is advantageously located between the approximate middle and the front of its frame section, which provides improved weight balance. The lift mechanism rocker link is pivotally connected to a rear lift wheel link that extends rearward and pivotally connects with a rear lift wheel bell crank attached to a rear lift wheel arm and/or a rockshaft. The rear lift wheel arm carries at its free end the rear lift wheels. A gauge wheel link is also pivotally connected to the lift mechanism rocker link, and extends forward and pivotally connects with a gauge wheel parallel arm bell crank attached to a gauge wheel lower parallel arm. A gauge wheel upper parallel arm and the gauge wheel lower parallel arm are pivotally attached to a cross frame member and to a front gauge wheel pivot. The front gauge wheel pivot carries a front gauge wheel.

In order to raise its respective frame section, the hydraulic lift cylinder is extended, causing the lift mechanism rocker link to pivot so that the rear lift wheel link is pulled forward in tension, thereby pulling the rear lift wheel bell crank forward in the travel direction. The rear lift wheel arm therefore pivots downward on the rockshaft, raising the frame section on the rear lift wheels. In the case of the lift and gauge wheel lift mechanism used in the center frame, the rockshaft may be a single rockshaft to which multiple rear lift wheel arms are attached. In this embodiment, the rockshaft serves to coordinate motion between the rear lift wheel arms, thereby maintaining the center frame section level from side to side. Alternately, each rear lift wheel arm may be attached to a separate rockshaft, so that the rear lift wheel arms may be actuated independently, allowing for side to side levelling adjustment of the center frame section. Still alternately, in an embodiment wherein each center frame rear lift wheel arm is attached to the same rockshaft, only a single center frame hydraulic lift cylinder may be required for the center frame lift and gauge wheel lift mechanism. In this case, both center frame rear lift wheel arms are actuated by the single center frame hydraulic lift cylinder by way of their connection to the center frame rockshaft.

Further, when the hydraulic lift cylinder is extended, the gauge wheel link is pulled rearward in tension. This pivots the gauge wheel upper and lower parallel arms downwards as the motion is transmitted through the gauge wheel parallel arm bell crank. The front of the respective frame section is thereby raised on the front gauge wheels attached to the gauge wheel upper and lower parallel arms by way of the front gauge wheel pivot. The respective frame section is thereby maintained in a level state by the front gauge wheels. In the embodiment of the center frame lift and gauge wheel lift mechanism having only one center frame hydraulic lift cylinder, the center frame front gauge wheels of the side of the center frame lift and gauge wheel lift mechanism not having a center frame hydraulic lift cylinder are actuated by the motion of the center frame rockshaft transmitted through the center frame rear lift wheel link, the center frame lift mechanism rocker link, and the center frame gauge wheel link on that side.

Each gauge wheel link may in the form of a turnbuckle, so that the level of the respective frame section fore and aft may be adjusted by twisting the turnbuckle so that it extends or contracts. Extending the gauge wheel link in the form of a turnbuckle effectively lowers the front of the frame section. Contracting the gauge wheel link in the form of a turnbuckle effectively raises the front of the frame section. A gauge wheel turnbuckle locking device may be provided to prevent the turnbuckle from changing positions while in use. The rear lift wheel link may also be in the form of a turnbuckle, in order to provide further adjustability. An alternate embodiment wherein the center frame rear lift wheel link is in the form of a turnbuckle may be used to provide side to side levelling adjustability when separate center frame rockshafts are used for each center frame rear lift wheel arm, or even when a common center frame rockshaft is used.

The lift and gauge wheel lift mechanism is generally configured so that each of the rear lift wheel link and the gauge wheel link is in tension. This results in a stronger and more stable lift and gauge wheel lift mechanism. However, it is also contemplated that, in another embodiment of the lift and gauge wheel lift mechanism, the rear lift wheel link may pivotally connect with the lift mechanism rocker link and with the rear lift wheel arm such that, upon extension of the hydraulic lift cylinder, the lift mechanism rocker link is pivoted so that the rear lift wheel link is pushed rearward opposite the direction of travel. This causes the rear lift wheel arm to rotate downward, raising the respective frame section on the rear lift wheels. Similarly, the gauge wheel link may pivotally connect with the lift mechanism rocker link and with a gauge wheel parallel arm bell crank attached to the gauge wheel upper parallel arm such that, upon extension of the hydraulic lift cylinder, the lift mechanism rocker link is pivoted so that the gauge wheel link is pushed forward in the direction of travel. This pivots the gauge wheel upper and lower parallel arms downwards as the motion is transmitted through the gauge wheel parallel arm bell crank. The front of the respective frame section is thereby raised on the front gauge wheels attached to the gauge wheel upper and lower parallel arms by way of the a front gauge wheel pivot.

The various embodiments of the lift and gauge wheel lift mechanism may be employed on an agricultural tillage implement, such as a field cultivator, or in any agricultural or industrial implement wherein it is advantageous to raise and lower the implement while providing for side to side and front to back levelling adjustment of the implement.

The invention in one form is directed to an agricultural or industrial implement having at least one frame section. At least one lift and gauge wheel lift mechanism connected to the at least one frame section. The at least one lift and gauge wheel lift mechanism has a hydraulic lift cylinder pivotally connected to a lift mechanism rocker link. The lift mechanism rocker link and the hydraulic lift cylinder are each pivotally connected to the at least one frame section. A rear lift wheel link is pivotally connected to the lift mechanism rocker link. The rear lift wheel link is pivotally connected to either a rear lift wheel arm, or to a rear lift wheel bell crank attached to the rear lift wheel arm. At least one rear lift wheel is attached to the rear lift wheel arm. The rear lift wheel arm is pivotally connected to the at least one frame section. A gauge wheel link is pivotally connected to the lift mechanism rocker link. The gauge wheel link is pivotally connected to a gauge wheel parallel arm bell crank. The gauge wheel parallel arm bell crank is attached to either a gauge wheel upper parallel arm, or to a gauge wheel lower parallel arm. At least one front gauge wheel is connected to the gauge wheel upper parallel arm and to the gauge wheel lower parallel arm.

The invention in another form is directed to a lift and gauge wheel lift mechanism of an agricultural or industrial implement having at least one frame section. A hydraulic lift cylinder is pivotally connected to a lift mechanism rocker link. The lift mechanism rocker link and the hydraulic lift cylinder are each pivotally connected to the at least one frame section. A rear lift wheel link is pivotally connected to the lift mechanism rocker link. The rear lift wheel link is pivotally connected to either a rear lift wheel arm or to a rear lift wheel bell crank attached to the rear lift wheel arm. At least one rear lift wheel is attached to the rear lift wheel arm. The rear lift wheel arm is pivotally connected to the at least one frame section. A gauge wheel link is pivotally connected to the lift mechanism rocker link. The gauge wheel link is pivotally connected to a gauge wheel parallel arm bell crank. The gauge wheel parallel arm bell crank is attached to either a gauge wheel upper parallel arm or to a gauge wheel lower parallel arm. At least one front gauge wheel is connected to the gauge wheel upper parallel arm and to the gauge wheel lower parallel arm.

One advantage of the present invention is that it is simple, reliable, strong, and stable. Another advantage is that it makes minimal use of hydraulic valves, cylinders, and controls, yet provides for simple front to back and side to side leveling control and adjustability. Still another advantage is that embodiments of the lift and gauge wheel lift mechanism provide improved weight balance by locating the single cylinder used to raise and lower the rear lift wheels and the front gauge wheels between the middle and the front of the frame of the agricultural or industrial implement.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
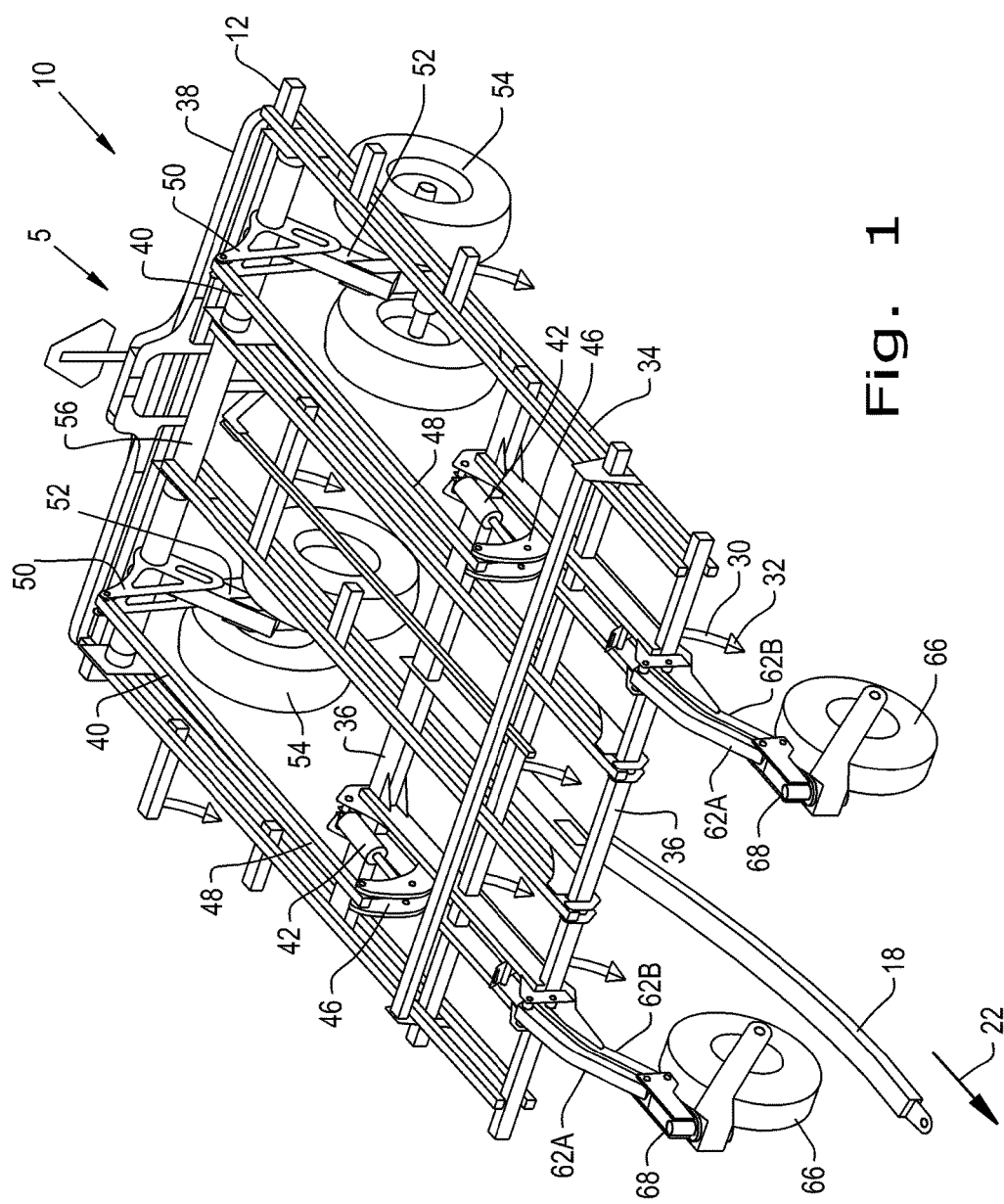
FIG. 1 is a top front isometric view of a lift and gauge wheel lift mechanism of a main frame section of an agricultural tillage implement according to an embodiment of the invention.
Figure 2:
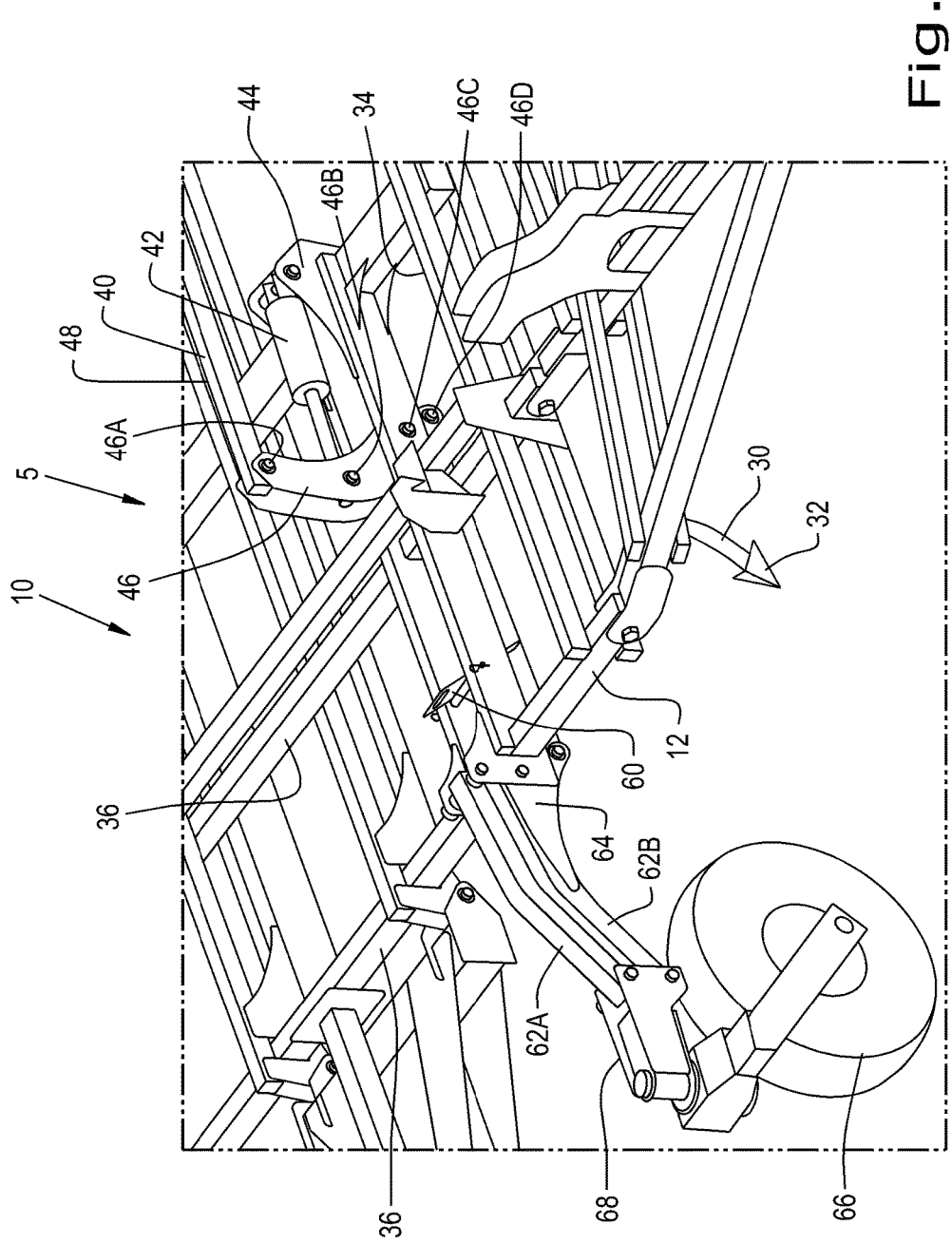
FIG. 2 is a partial top front isometric view of a lift and gauge wheel lift mechanism of a main frame section of an agricultural tillage implement according to an embodiment of the invention.

Referring now to the drawings, and more particularly to FIGS. 1-4, there is shown an embodiment of an agricultural tillage implement 5 of the present invention. In the illustrated embodiment, the tillage implement 5 is in the form of a field cultivator 10 for tilling and finishing soil prior to seeding. Field cultivator 10 is configured as a multi-section field cultivator, and includes a center frame section 12 and at least one wing frame section 14 (not shown in FIGS. 1-4). Center frame section 12 is the center section that is directly towed by a traction unit, such as an agricultural tractor (not shown), in a travel direction 22. A pull hitch 18 extends forward from center frame section 12, and is coupled with the traction unit in known manner.

Center frame section 12 and wing frame section 14 generally function to carry cultivator shanks 30 with shovels 32 at their lower ends for tilling the soil. Center frame section 12 and wing frame section 14 both include longitudinal frame members 34, fore cross frame members 36, and aft cross frame members 38. Center frame rear lift wheels 54 are used for raising and lowering the center frame section 12. Center frame front gauge wheels 66 are used for fore and aft levelling the center frame section 12. In order to accomplish this with a minimum amount of hydraulics, a center frame lift and gauge wheel lift mechanism 40 utilizes a center frame hydraulic lift cylinder 42. The center frame hydraulic lift cylinder 42 is pivotally connected to a fore cross frame member 36 using a center frame hydraulic lift cylinder frame mount 44, and is pivotally connected to a center frame lift mechanism rocker link 46. The center frame hydraulic lift cylinder 42 in the center frame lift and gauge wheel lift mechanism 40 shown on FIGS. 1-4 is advantageously located between the approximate middle and the front of the center frame section 12 of the field cultivator 10, which provides improved weight balance.

The center frame lift mechanism rocker link 46 is pivotally connected to the fore cross frame member 36 at a lower middle pivot 46C, and the center frame hydraulic lift cylinder 42 is pivotally connected to the center frame lift mechanism rocker link 46 at an upper middle pivot 46B. A center frame rear lift wheel link 48 is pivotally connected to the center frame lift mechanism rocker link 46 at an upmost pivot 46A, and extends rearward and pivotally connects with a center frame rear lift wheel bell crank 50. The center frame rear lift wheel bell crank 50 is attached to a center frame rear lift wheel arm 52 and/or a center frame rockshaft 56. The center frame rear lift wheel arm 52 is also attached to the center frame rockshaft 56, and carries at its free end the center frame rear lift wheels 54.

A center frame gauge wheel link 58 is pivotally connected to the center frame lift mechanism rocker link 46 at a lowest pivot 46D, and extends forward and pivotally connects with a center frame gauge wheel parallel arm bell crank 64. The center frame gauge wheel parallel arm bell crank 64 is attached to a center frame gauge wheel lower parallel arm 62B. Center frame gauge wheel upper parallel arm 62A and center frame gauge wheel lower parallel arm 62B are pivotally attached to a fore cross frame member 36 and to a center frame front gauge wheel pivot 68. The center frame front gauge wheel pivot 68 carries a center frame front gauge wheel 66.

In order to raise the center frame section 12, the center frame hydraulic lift cylinder 42 is extended, causing the center frame lift mechanism rocker link 46 to pivot so that the upmost pivot 46A moves forward in the travel direction 22, and so that the lowest pivot 46D moves rearward opposite to the travel direction 22. The center frame rear lift wheel link 48 is pulled forward in tension, thereby pulling the center frame rear lift wheel bell crank 50 forward in the travel direction. The center frame rear lift wheel arm 52 therefore pivots downward on the center frame rockshaft 56, raising the center frame section 12 on the center frame rear lift wheels 54. The center frame rockshaft 56 may be a single rockshaft to which multiple center frame rear lift wheel arms 52 are attached, as shown. In this embodiment, the center frame rockshaft 56 serves to coordinate motion between the center frame rear lift wheel arms 52, thereby maintaining the center frame section 12 level from side to side.

Alternately, each center frame rear lift wheel arm 52 may be attached to a separate rockshaft, so that the center frame rear lift wheel arms 52 may be actuated independently, allowing for side to side levelling adjustment of the center frame section 12. Still alternately, in an embodiment wherein each center frame rear lift wheel arm 52 is attached to the same rockshaft, only a single center frame hydraulic lift cylinder 42 may be required for the center frame lift and gauge wheel lift mechanism 40. In this case, both center frame rear lift wheel arms 52 are actuated by the single center frame hydraulic lift cylinder 42 by way of their connection to the center frame rockshaft 56.

When the center frame hydraulic lift cylinder 42 is extended and the lowest pivot 46D of the center frame lift mechanism rocker link 46 moves rearward opposite to the travel direction 22, the center frame gauge wheel link 58 is pulled rearward in tension. This pivots the center frame gauge wheel upper and lower parallel arms 62A, 62B downwards as the motion is transmitted through the center frame gauge wheel parallel arm bell crank 64. The front of the center frame section 12 is thereby raised on the center frame front gauge wheels 66 attached to the center frame gauge wheel upper and lower parallel arms 62A, 62B by way of the center frame front gauge wheel pivot 68. The center frame section 12 is thereby maintained in a level state by the center frame front gauge wheels 66. In the embodiment of the center frame lift and gauge wheel lift mechanism 40 described above having only one center frame hydraulic lift cylinder 42, the center frame front gauge wheels 66 of the side of the center frame lift and gauge wheel lift mechanism 40 not having a center frame hydraulic lift cylinder 42 are actuated by the motion of the center frame rockshaft 56 transmitted through the center frame rear lift wheel link 48, the center frame lift mechanism rocker link 46, and the center frame gauge wheel link 58 on that side.

As illustrated in FIGS. 1-4, the center frame gauge wheel link 58 is in the form of a turnbuckle. In order to manually adjust the level of the center frame section 12 fore and aft, or front to rear, the center frame gauge wheel link 58 in the form of a turnbuckle is twisted so that it extends or contracts. Extending the center frame gauge wheel link 58 in the form of a turnbuckle effectively lowers the front of the center frame section 12. Contracting the center frame gauge wheel link 58 in the form of a turnbuckle effectively raises the front of the center frame section 12. A center frame gauge wheel turnbuckle locking device 60 may be engaged with the center frame gauge wheel link 58 in the form of a turnbuckle to prevent it from changing positions while in use. As illustrated, the center frame gauge wheel turnbuckle locking device 60 operates passively by gravity, so that it defaults to a locked condition, and must be manually raised in order unlock the center frame gauge wheel link 58 in the form of a turnbuckle.

As illustrated, the center frame rear lift wheel link 48 is shown having a fixed length. However, it may alternately be in the form of a turnbuckle, in order to provide further adjustability. This alternate embodiment wherein the center frame rear lift wheel link 48 is in the form of a turnbuckle may be used to provide side to side levelling adjustability when separate center frame rockshafts 56 are used for each center frame rear lift wheel arm 52.

Figure 5:
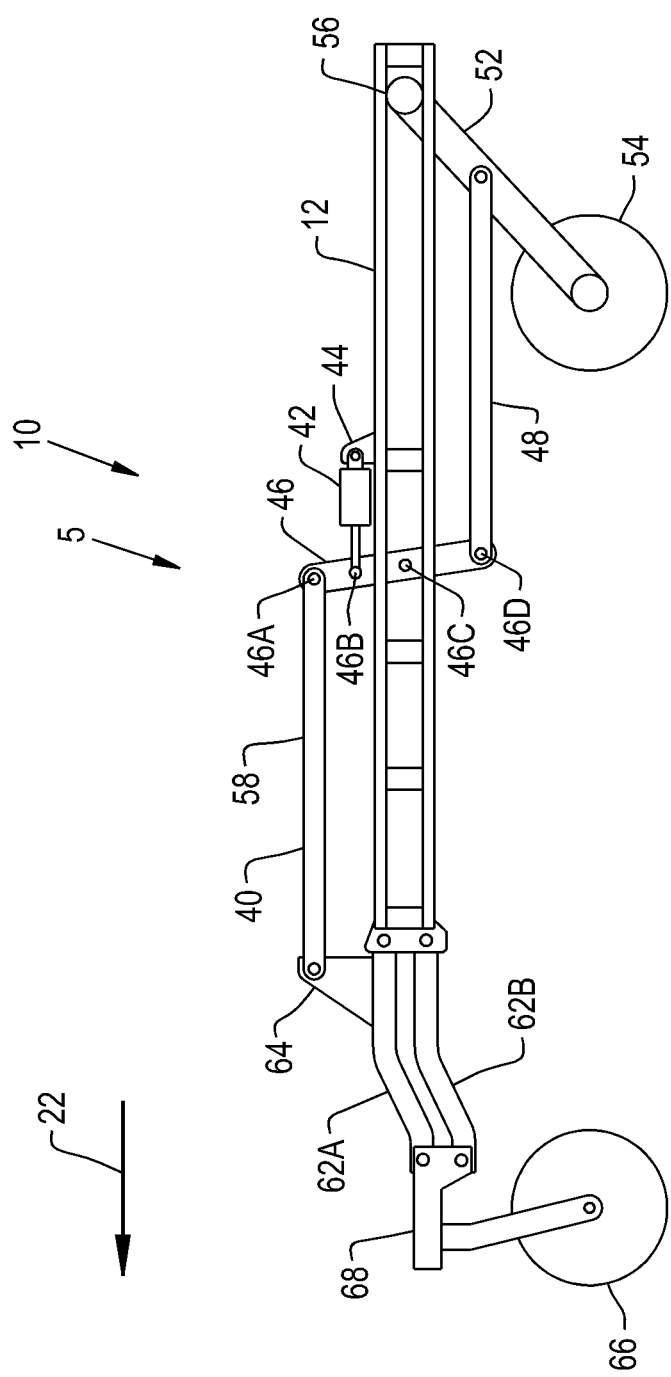
FIG. 5 is a side view of a lift and gauge wheel lift mechanism of a main frame section of an agricultural tillage implement according to an alternate embodiment of the invention.

The center frame lift and gauge wheel lift mechanism 40 shown in FIGS. 1-4 is configured so that each of the center frame rear lift wheel link 48 and the center frame gauge wheel link 58 is in tension when the center frame hydraulic lift cylinder 42 is extended and the center frame section 12 is raised on the center frame rear lift wheels 54 and on the center frame front gauge wheels 66. This results in a stronger and more stable center frame lift and gauge wheel lift mechanism 40. However, as shown in FIG. 5, it is also contemplated as within the scope of the invention that the center frame rear lift wheel link 48 may pivotally connect with the center frame lift mechanism rocker link 46 at a point 46D lower than the point 46C at which center frame lift mechanism rocker link 46 is pivotally connected to the fore cross frame member 36 of the center frame section 12. In this case, the center frame rear lift wheel link 48 pivotally connects with the center frame rear lift wheel arm 52 directly, at a point lower than where the center frame rear lift wheel arm 52 is attached to the center frame rockshaft 56. In this way, upon extension of the center frame hydraulic lift cylinder 42, the center frame lift mechanism rocker link 46 is pivoted so that the center frame rear lift wheel link 48 is pushed rearward in compression opposite the direction of travel 22, causing the center frame rear lift wheel arm 52 to rotate downward, raising the center frame section 12 on the center frame rear lift wheels 54.

Figure 3:
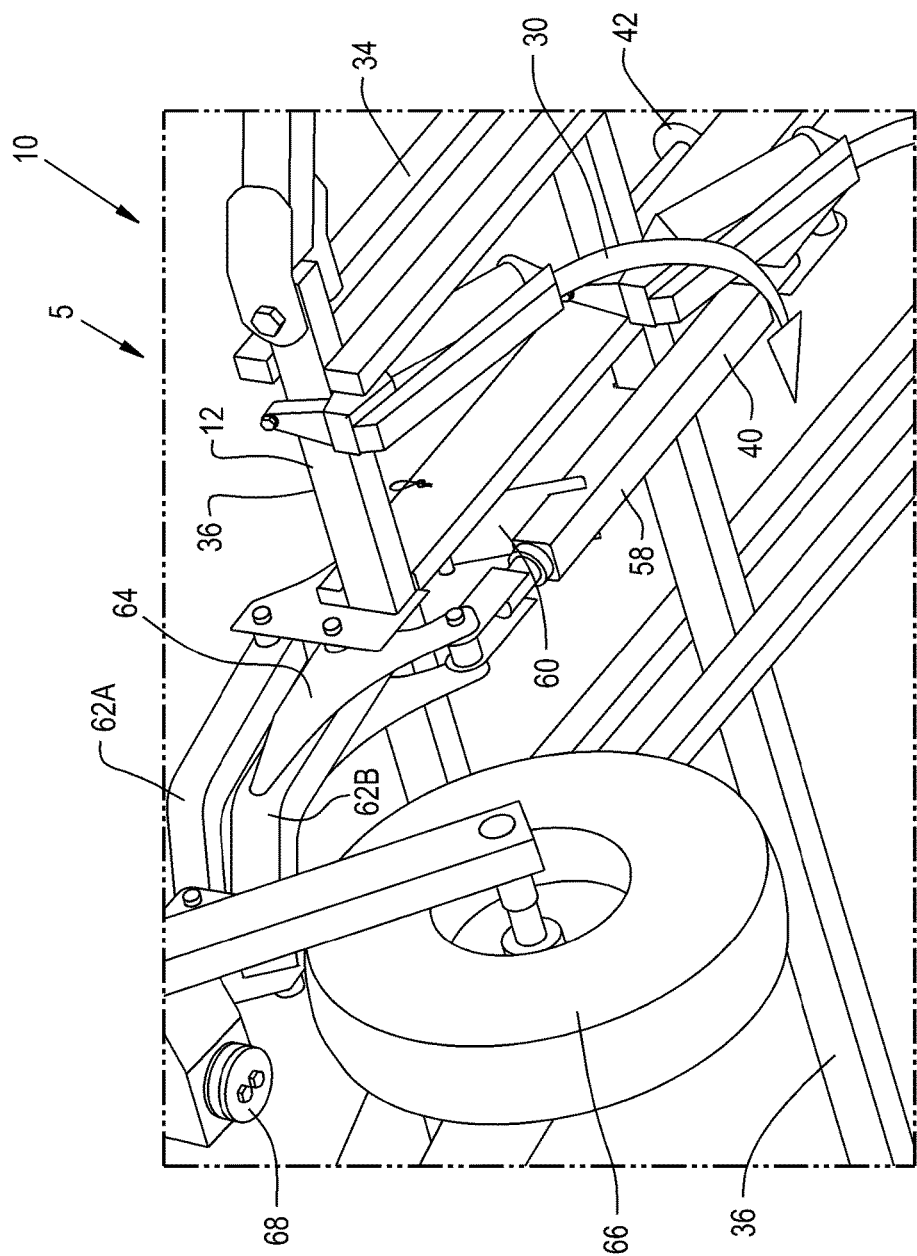
FIG. 3 is a partial bottom front isometric view of a lift and gauge wheel lift mechanism of a main frame section of an agricultural tillage implement according to an embodiment of the invention.
Figure 4:
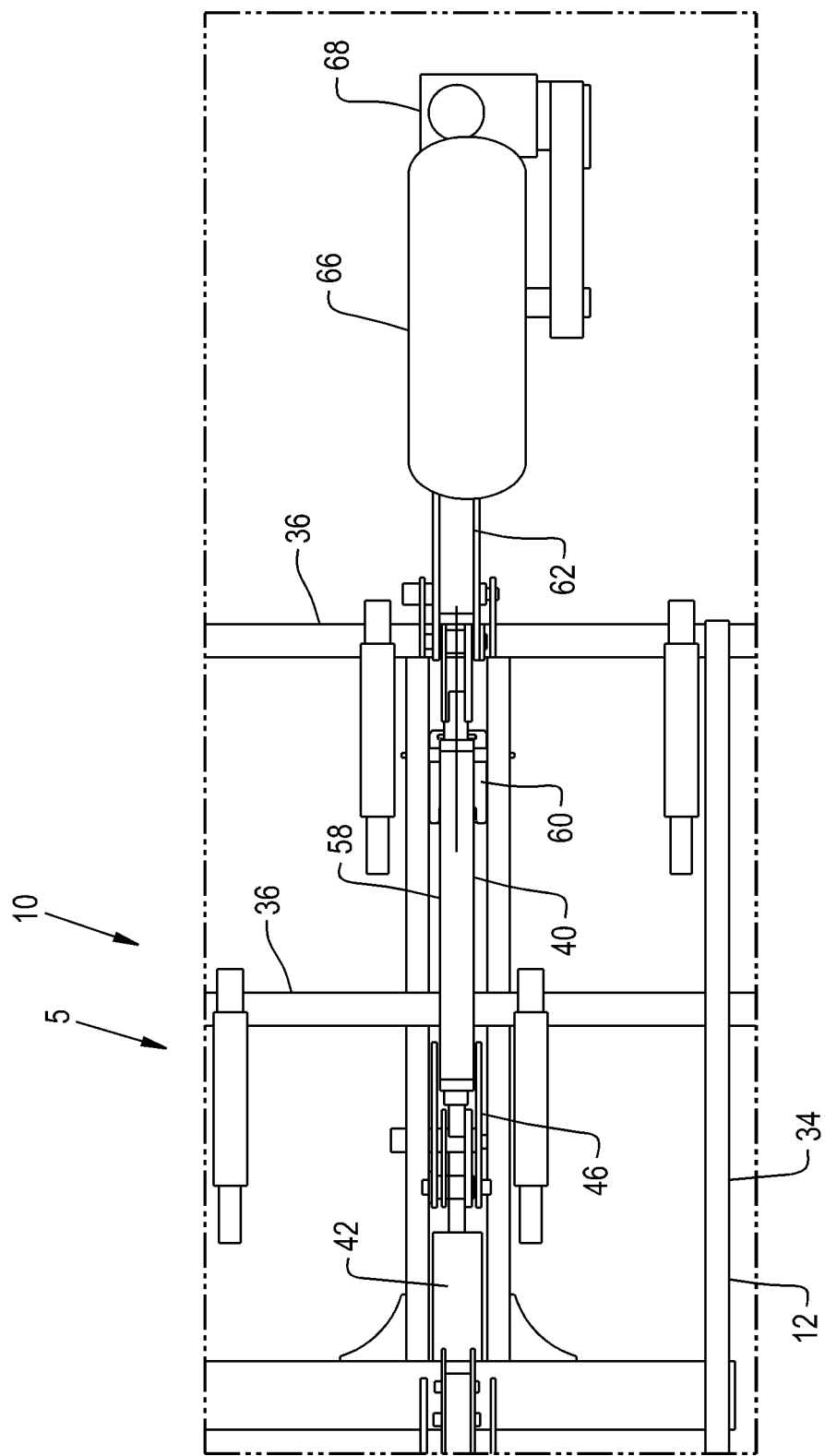
FIG. 4 is a partial bottom view of a lift and gauge wheel lift mechanism of a main frame section of an agricultural tillage implement according to an embodiment of the invention.

Similarly, in the alternate embodiment as shown in FIG. 5, the center frame gauge wheel link 58 may pivotally connect with the center frame lift mechanism rocker link 46 at a point 46A higher than the point 46C at which center frame lift mechanism rocker link 46 is pivotally connected to the fore cross frame member 36 of the center frame section 12. In this case, the center frame gauge wheel link 58 pivotally connects with a center frame gauge wheel parallel arm bell crank 64 attached to the center frame gauge wheel upper parallel arm 62A and extending upwards, symmetrically opposite to the center frame gauge wheel parallel arm bell crank 64 as shown in FIG. 3. In this way, upon extension of the center frame hydraulic lift cylinder 42, the center frame lift mechanism rocker link 46 is pivoted so that the center frame gauge wheel link 58 is pushed forward in compression in the direction of travel 22. This pivots the center frame gauge wheel upper and lower parallel arms 62A, 62B downwards as the motion is transmitted through the center frame gauge wheel parallel arm bell crank 64. The front of the center frame section 12 is thereby raised on the center frame front gauge wheels 66 attached to the center frame gauge wheel upper and lower parallel arms 62A, 62B by way of the center frame front gauge wheel pivot 68.

As shown in FIGS. 1-5, the various embodiments of the center frame lift and gauge wheel lift mechanism 40 are employed on an agricultural tillage implement 5 in the form of a field cultivator 10. However, it is contemplated that this arrangement may be employed in any agricultural or industrial implement wherein it is advantageous to raise and lower the implement while providing for side to side and front to back levelling adjustment of the implement.

Figure 6:
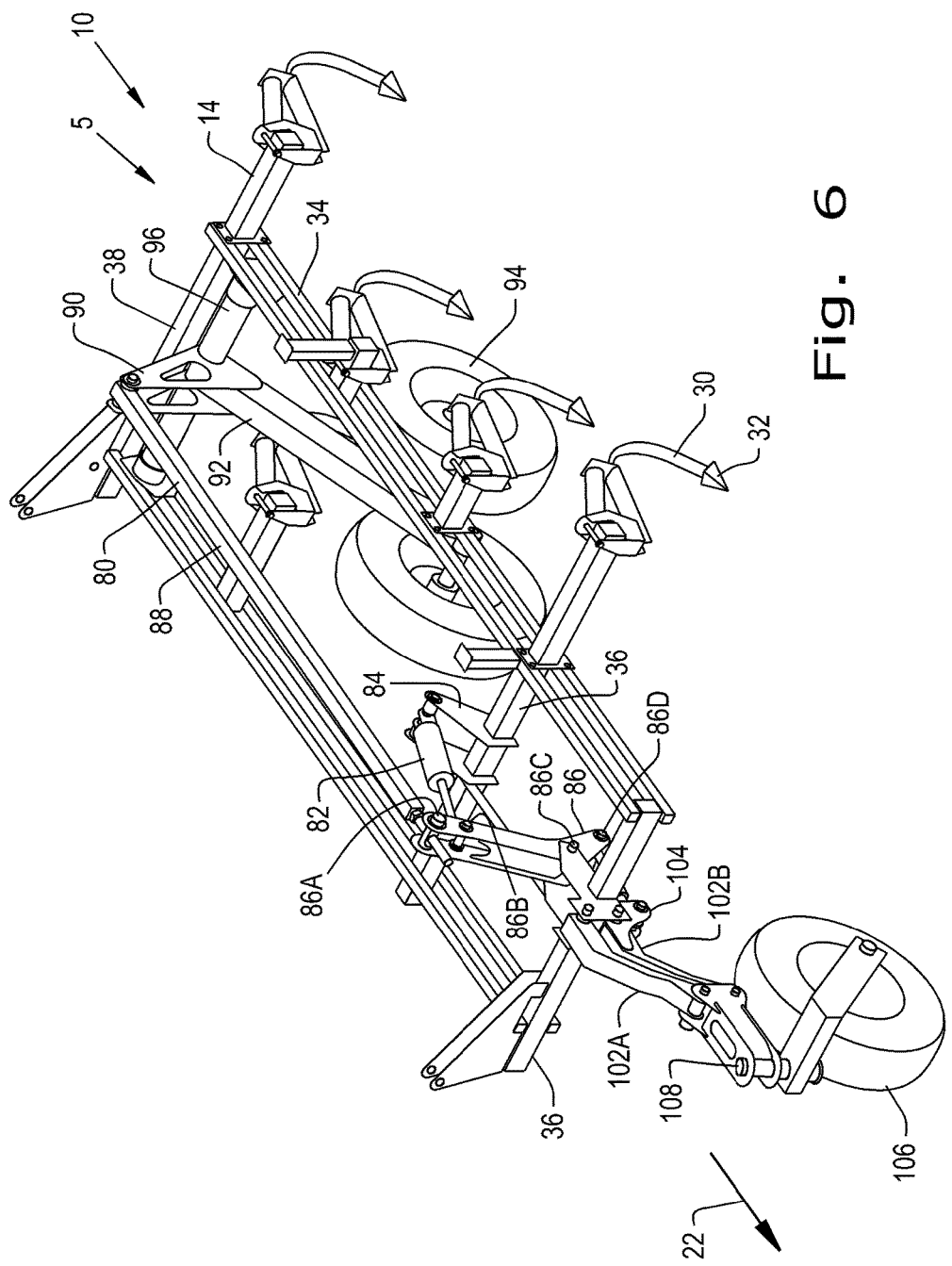
FIG. 6 is a top front isometric view of a lift and gauge wheel lift mechanism of a wing frame section of an agricultural tillage implement according to an embodiment of the invention.
Figure 7:
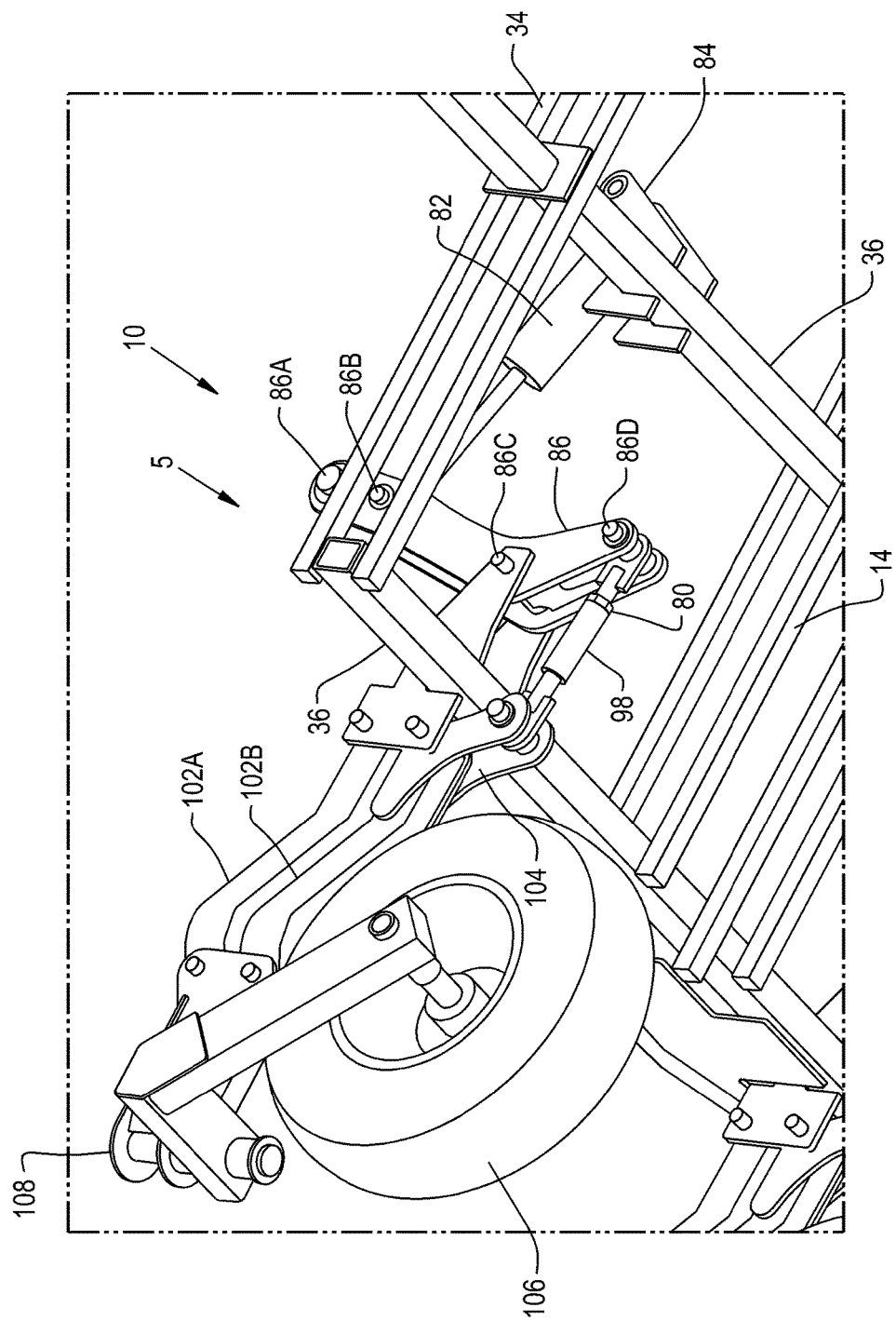
FIG. 7 is a partial bottom front isometric view of a lift and gauge wheel lift mechanism of a wing frame section of an agricultural tillage implement according to an embodiment of the invention.
Figure 8:
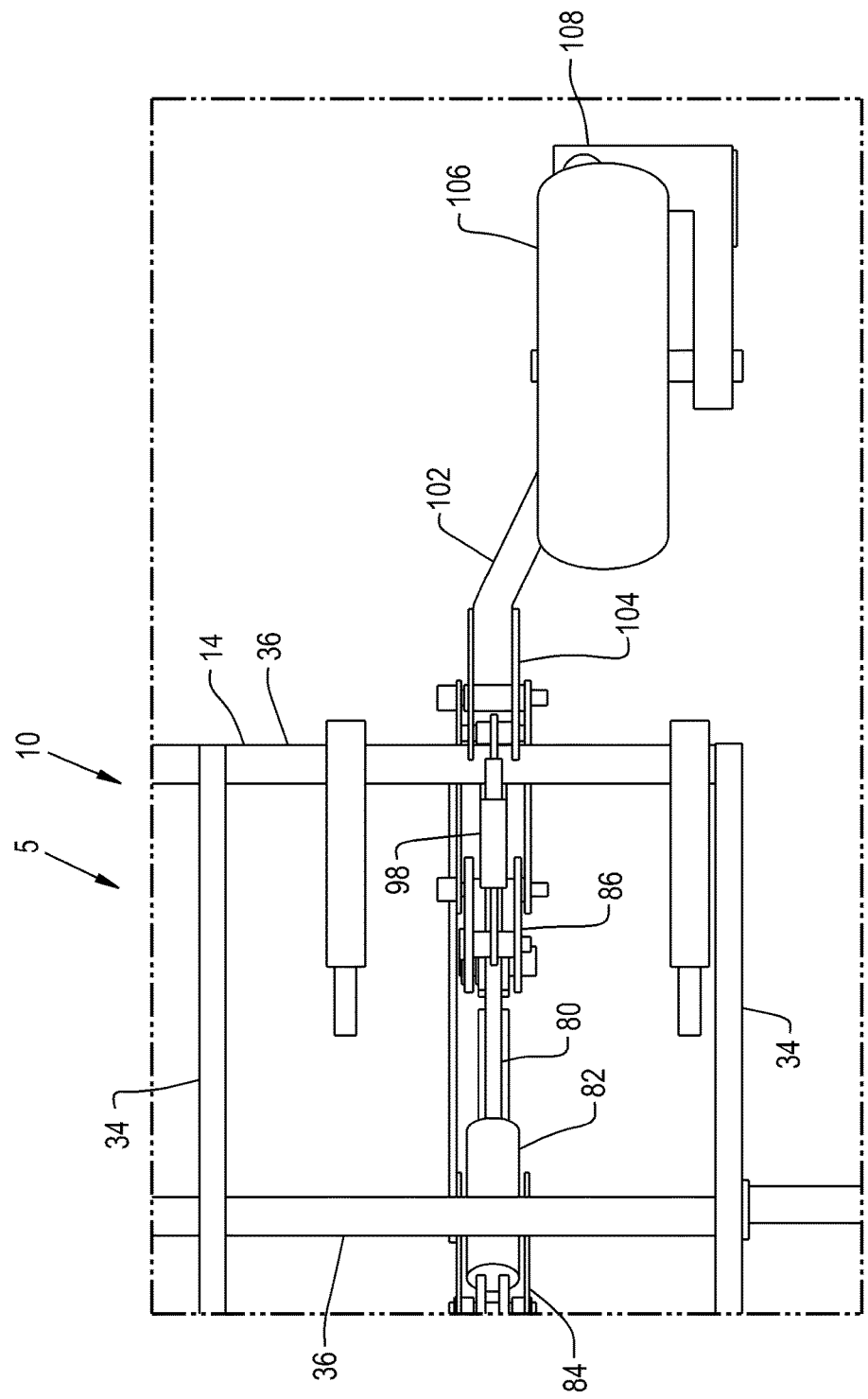
FIG. 8 is a partial bottom view of a lift and gauge wheel lift mechanism of a wing frame section of an agricultural tillage implement according to an embodiment of the invention.

Turning now to FIGS. 6-8, a wing frame section 14 of the agricultural tillage implement 5 in the form of a field cultivator 10 is shown. Wing frame section 14 generally functions to carry cultivator shanks 30 with shovels 32 at their lower ends for tilling the soil. Wing frame section 14 again includes longitudinal frame members 34, fore cross frame members 36, and aft cross frame members 38. Wing frame rear lift wheels 94 are used for raising and lowering the wing frame section 14. Wing frame front gauge wheels 106 are used for fore and aft levelling the wing frame section 14. In order to again accomplish this with a minimum amount of hydraulics, a wing frame lift and gauge wheel lift mechanism 80 utilizes a wing frame hydraulic lift cylinder 82. The wing frame hydraulic lift cylinder 82 is pivotally connected to a fore cross frame member 36 of the wing frame section 14 using a wing frame hydraulic lift cylinder frame mount 84, and is pivotally connected to a wing frame lift mechanism rocker link 86. The wing frame hydraulic lift cylinder 82 in the wing frame lift and gauge wheel lift mechanism 80 shown in FIGS. 6-8 is again advantageously located between the approximate middle and the front of the wing frame section 14 of the field cultivator 10, which provides improved weight balance.

The wing frame lift mechanism rocker link 86 is pivotally connected to the fore cross frame member 36 of the wing frame section 14 at a lower middle pivot 86C, and the wing frame hydraulic lift cylinder 82 is pivotally connected to the wing frame lift mechanism rocker link 86 at an upper middle pivot 86B. A wing frame rear lift wheel link 88 is pivotally connected to the wing frame lift mechanism rocker link 86 at an upmost pivot 86A, and extends rearward and pivotally connects with a wing frame rear lift wheel bell crank 90. The wing frame rear lift wheel bell crank 90 is attached to a wing frame rear lift wheel arm 92 and/or a wing frame rockshaft 96. The wing frame rear lift wheel arm 92 is also attached to the wing frame rockshaft 96, and carries at its free end the wing frame rear lift wheels 94.

A wing frame gauge wheel link 98 is pivotally connected to the wing frame lift mechanism rocker link 86 at a lowest pivot 86D, and extends forward and pivotally connects with a wing frame gauge wheel parallel arm bell crank 104. The wing frame gauge wheel parallel arm bell crank 104 is attached to a wing frame gauge wheel lower parallel arm 102B. Wing frame gauge wheel upper parallel arm 102A and wing frame gauge wheel lower parallel arm 102B are pivotally attached to a fore cross frame member 36 of the wing frame section 14 and to a wing frame front gauge wheel pivot 108. The wing frame front gauge wheel pivot 108 carries a wing frame front gauge wheel 106.

In order to raise the wing frame section 14, the wing frame hydraulic lift cylinder 82 is extended, causing the wing frame lift mechanism rocker link 86 to pivot so that the upmost pivot 86A moves forward in the travel direction 22, and so that the lowest pivot 86D moves rearward opposite to the travel direction 22. The wing frame rear lift wheel link 88 is pulled forward in tension, thereby pulling the wing frame rear lift wheel bell crank 90 forward in the travel direction. The wing frame rear lift wheel arm 92 therefore pivots downward on the wing frame rockshaft 96, raising the wing frame section 14 on the wing frame rear lift wheels 94.

When the wing frame hydraulic lift cylinder 82 is extended and the lowest pivot 86D of the wing frame lift mechanism rocker link 86 moves rearward opposite to the travel direction 22, the wing frame gauge wheel link 98 is pulled rearward in tension. This pivots the wing frame gauge wheel upper and lower parallel arms 102A, 102B downwards as the motion is transmitted through the wing frame gauge wheel parallel arm bell crank 104. The front of the wing frame section 14 is thereby raised on the wing frame front gauge wheels 106 attached to the wing frame gauge wheel upper and lower parallel arms 102A, 102B by way of the wing frame front gauge wheel pivot 108. The wing frame section 14 is thereby maintained in a level state by the wing frame front gauge wheels 106.

As illustrated in FIGS. 6-8, the wing frame gauge wheel link 98 is in the form of a turnbuckle. In order to manually adjust the level of the wing frame section 14 fore and aft, or front to rear, the wing frame gauge wheel link 98 in the form of a turnbuckle is twisted so that it extends or contracts. Extending the wing frame gauge wheel link 98 in the form of a turnbuckle effectively lowers the front of the wing frame section 14. Contracting the wing frame gauge wheel link 98 in the form of a turnbuckle effectively raises the front of the wing frame section 14. Also, the wing frame rear lift wheel link 88 is shown in the form of a turnbuckle, in order to provide further adjustability.

Figure 9:
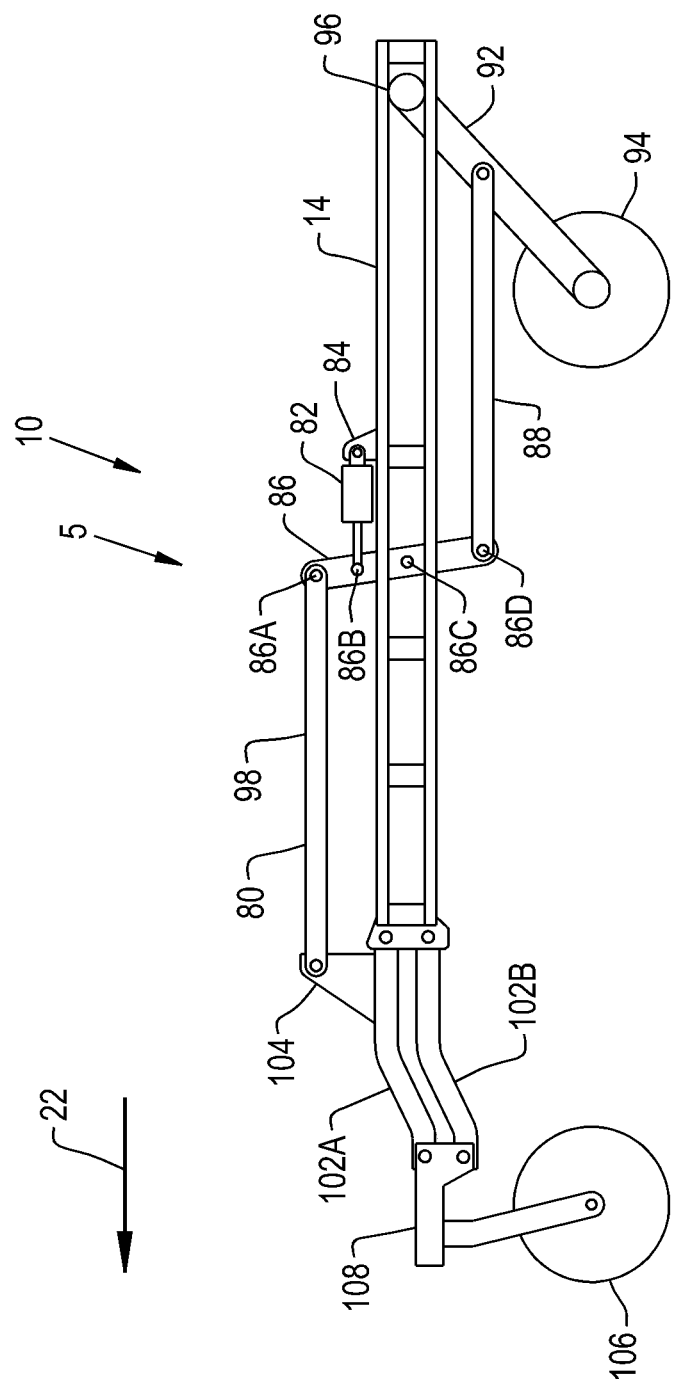
FIG. 9 is a side view of a lift and gauge wheel lift mechanism of a wing frame section of an agricultural tillage implement according to an alternate embodiment of the invention.

The wing frame lift and gauge wheel lift mechanism 80 shown in FIGS. 6-8 is configured so that each of the wing frame rear lift wheel link 88 and the wing frame gauge wheel link 98 is in tension when the wing frame hydraulic lift cylinder 82 is extended and the wing frame section 14 is raised on the wing frame rear lift wheels 94 and on the wing frame front gauge wheels 106. As with the center frame lift and gauge wheel lift mechanism 40, this results in a stronger and more stable wing frame lift and gauge wheel lift mechanism 80. However, as shown in FIG. 9, it is also contemplated as within the scope of the invention that the wing frame rear lift wheel link 88 of the wing lift and gauge wheel lift mechanism 80 may pivotally connect with the wing frame lift mechanism rocker link 86 at a point 86D lower than the point 86C at which wing frame lift mechanism rocker link 86 is pivotally connected to the fore cross frame member 36 of the wing frame section 14. In this case, the wing frame rear lift wheel link 88 pivotally connects with the wing frame rear lift wheel arm 92 directly, at a point lower than where the wing frame rear lift wheel arm 92 is attached to the wing frame rockshaft 96. In this way, upon extension of the wing frame hydraulic lift cylinder 82, the wing frame lift mechanism rocker link 86 is pivoted so that the wing frame rear lift wheel link 88 is pushed rearward in compression opposite the direction of travel 22, causing the wing frame rear lift wheel arm 92 to rotate downward, raising the wing frame section 14 on the wing frame rear lift wheels 94.

Similarly, in the alternate embodiment as shown in FIG. 9, the wing frame gauge wheel link 98 may pivotally connect with the wing frame lift mechanism rocker link 86 at a point 86A higher than the point 86C at which wing frame lift mechanism rocker link 86 is pivotally connected to the fore cross frame member 36 of the wing frame section 14. In this case, the wing frame gauge wheel link 98 pivotally connects with a wing frame gauge wheel parallel arm bell crank 104 attached to the wing frame gauge wheel upper parallel arm 102A and extending upwards, symmetrically opposite to the wing frame gauge wheel parallel arm bell crank 104 as shown in FIG. 7. In this way, upon extension of the wing frame hydraulic lift cylinder 82, the wing frame lift mechanism rocker link 86 is pivoted so that the wing frame gauge wheel link 98 is pushed forward in compression in the direction of travel 22. This pivots the wing frame gauge wheel upper and lower parallel arms 102A, 102B downwards as the motion is transmitted through the wing frame gauge wheel parallel arm bell crank 104. The front of the wing frame section 14 is thereby raised on the wing frame front gauge wheels 106 attached to the wing frame gauge wheel upper and lower parallel arms 102A, 102B by way of the wing frame front gauge wheel pivot 108.

As shown in FIGS. 6-9, the various embodiments of the wing frame lift and gauge wheel lift mechanism 80 are employed on an agricultural tillage implement 5 in the form of a field cultivator 10. However, it is contemplated that this arrangement may be employed in any agricultural or industrial implement wherein it is advantageous to raise and lower a wing of the implement while providing for side to side and front to back levelling adjustment of the wing of the implement.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural or industrial implement, comprising:
    at least one frame section;
    at least one lift and gauge wheel lift mechanism connected to said at least one frame section, said at least one lift and gauge wheel lift mechanism further comprising:
        a hydraulic lift cylinder pivotally connected to a lift mechanism rocker link, said lift mechanism rocker link and said hydraulic lift cylinder each being pivotally connected to said at least one frame section;
        a rear lift wheel link pivotally connected to said lift mechanism rocker link;
        a rear lift wheel arm, said rear lift wheel link being pivotally connected to said rear lift wheel arm or a rear lift wheel bell crank attached to said rear lift wheel arm;
        at least one rear lift wheel attached to said rear lift wheel arm, said rear lift wheel arm being pivotally connected to said at least one frame section;
        a gauge wheel link pivotally connected to said lift mechanism rocker link, said gauge wheel link being pivotally connected to a gauge wheel parallel arm bell crank;
        a gauge wheel upper parallel arm and a gauge wheel lower parallel arm, said gauge wheel parallel arm bell crank being attached to at least one of said gauge wheel upper parallel arm and said gauge wheel lower parallel arm; and
    at least one front gauge wheel connected to said gauge wheel upper parallel arm and to said gauge wheel lower parallel arm by a wheel pivot, said gauge wheel link is pivotally connected to said lift mechanism rocker link and is pivotally connected to said gauge wheel parallel arm bell crank, said gauge wheel parallel arm bell crank being attached to said gauge wheel lower parallel arm, such that said gauge wheel link is in tension when a front of said at least one frame section is raised using said at least one front gauge wheel.

2. The agricultural or industrial implement of claim 1, wherein:
    said rear lift wheel link is pivotally connected to said lift mechanism rocker link and is pivotally connected to a rear lift wheel bell crank attached to said rear lift wheel arm such that said rear lift wheel link is in tension when said at least one frame section is raised using said at least one rear lift wheel.

3. The agricultural or industrial implement of claim 1, wherein:
    said rear lift wheel link is pivotally connected to said lift mechanism rocker link and is pivotally connected to said rear lift wheel arm such that said rear lift wheel link is in compression when said at least one frame section is raised using said at least one rear lift wheel.

4. The agricultural or industrial implement of claim 1, wherein:
    said gauge wheel link is pivotally connected to said lift mechanism rocker link and is pivotally connected to said gauge wheel parallel arm bell crank, said gauge wheel parallel arm bell crank being attached to said gauge wheel upper parallel arm, such that said gauge wheel link is in compression when a front of said at least one frame section is raised using said at least one front gauge wheel.

5. The agricultural or industrial implement of claim 1, wherein:
    said lift mechanism rocker link having an upper middle pivot, a lower middle pivot, an upmost pivot, and a lowest pivot;
    said lift mechanism rocker link being pivotally connected to said at least one frame section at said lower middle pivot;
    said hydraulic lift cylinder being pivotally connected to said lift mechanism rocker link at said upper middle pivot;
    said rear lift wheel link being pivotally connected to said lift mechanism rocker link at said upmost pivot; and
    said gauge wheel link being pivotally connected to said lift mechanism rocker link at said lowest pivot.

6. The agricultural or industrial implement of claim 1, wherein:
    said rear lift wheel arm being pivotally connected to said at least one frame section by way of a rockshaft.

7. The agricultural or industrial implement of claim 6, further comprising:
    a second hydraulic lift cylinder pivotally connected to a second lift mechanism rocker link, said second lift mechanism rocker link and said second hydraulic lift cylinder each being pivotally connected to said at least one frame section;
    a second rear lift wheel link pivotally connected to said second lift mechanism rocker link, said second rear lift wheel link being pivotally connected to at least one of a second rear lift wheel arm and a second rear lift wheel bell crank attached to said second rear lift wheel arm;
    at least one second rear lift wheel attached to said second rear lift wheel arm, said second rear lift wheel arm being pivotally connected to said at least one frame section by way of said rockshaft, said rockshaft coordinating the motion of said at least one rear lift wheel arm and said at least one second rear lift wheel arm;
    a second gauge wheel link pivotally connected to said second lift mechanism rocker link, said second gauge wheel link being pivotally connected to a second gauge wheel parallel arm bell crank;
    a second gauge wheel upper parallel arm and a second gauge wheel lower parallel arm, said second gauge wheel parallel arm bell crank being attached to at least one of said second gauge wheel upper parallel arm and said second gauge wheel lower parallel arm; and
    at least one second front gauge wheel connected to said second gauge wheel upper parallel arm and to said second gauge wheel lower parallel arm.

8. The agricultural or industrial implement of claim 1, wherein:
    at least one of said rear lift wheel link and said gauge wheel link includes a turnbuckle.

9. The agricultural or industrial implement of claim 8, further comprising:
    a locking device engageable with said turnbuckle.

10. An agricultural or industrial implement, comprising:
    at least one frame section;
    at least one lift and gauge wheel lift mechanism connected to said at least one frame section, said at least one lift and gauge wheel lift mechanism further comprising:
        a hydraulic lift cylinder pivotally connected to a lift mechanism rocker link, said lift mechanism rocker link and said hydraulic lift cylinder each being pivotally connected to said at least one frame section;

a rear lift wheel link pivotally connected to said lift mechanism rocker link;

a rear lift wheel arm, said rear lift wheel link being pivotally connected to said rear lift wheel arm or a rear lift wheel bell crank attached to said rear lift wheel arm;

at least one rear lift wheel attached to said rear lift wheel arm, said rear lift wheel arm being pivotally connected to said at least one frame section;

a gauge wheel link pivotally connected to said lift mechanism rocker link, said gauge wheel link being pivotally connected to a gauge wheel parallel arm bell crank;

a gauge wheel upper parallel arm and a gauge wheel lower parallel arm, said gauge wheel parallel arm bell crank being attached to at least one of said gauge wheel upper parallel arm and said gauge wheel lower parallel arm; and at least one front gauge wheel connected to said gauge wheel upper parallel arm and to said gauge wheel lower parallel arm by a wheel pivot, said at least one frame section further comprises a center frame section and at least one wing frame section, said center frame section including said at least one lift and gauge wheel lift mechanism and said at least one wing frame section including said at least one lift and gauge wheel lift mechanism.

11. A lift and gauge wheel lift mechanism of an agricultural or industrial implement having at least one frame section, comprising:

a hydraulic lift cylinder pivotally connected to a lift mechanism rocker link, said lift mechanism rocker link and said hydraulic lift cylinder each being pivotally connected to the at least one frame section;

a rear lift wheel link pivotally connected to said lift mechanism rocker link;

a rear lift wheel arm, said rear lift wheel link being pivotally connected to at least one of said rear lift wheel arm and a rear lift wheel bell crank attached to said rear lift wheel arm;

at least one rear lift wheel attached to said rear lift wheel arm, said rear lift wheel arm being pivotally connected to the at least one frame section;

a gauge wheel link pivotally connected to said lift mechanism rocker link, said gauge wheel link being pivotally connected to a gauge wheel parallel arm bell crank;

a gauge wheel upper parallel arm and a gauge wheel lower parallel arm, said gauge wheel parallel arm bell crank being attached to at least one of said gauge wheel upper parallel arm and said gauge wheel lower parallel arm; and at least one front gauge wheel connected to said gauge wheel upper parallel arm and to said gauge wheel lower parallel arm by a wheel pivot, said rear lift wheel link is pivotally connected to said lift mechanism rocker link and is pivotally connected to said rear lift wheel arm such that said rear lift wheel link is in compression when the at least one frame section is raised using said at least one rear lift wheel.

12. The lift and gauge wheel lift mechanism of claim 11, wherein:

said rear lift wheel link is pivotally connected to said lift mechanism rocker link and is pivotally connected to a rear lift wheel bell crank attached to said rear lift wheel arm such that said rear lift wheel link is in tension when the at least one frame section is raised using said at least one rear lift wheel.

13. The lift and gauge wheel lift mechanism of claim 11, wherein:

said gauge wheel link is pivotally connected to said lift mechanism rocker link and is pivotally connected to said gauge wheel parallel arm bell crank, said gauge wheel parallel arm bell crank being attached to said gauge wheel lower parallel arm, such that said gauge wheel link is in tension when a front of the at least one frame section is raised using said at least one front gauge wheel.

14. The lift and gauge wheel lift mechanism of claim 11, wherein:

said gauge wheel link is pivotally connected to said lift mechanism rocker link and is pivotally connected to said gauge wheel parallel arm bell crank, said gauge wheel parallel arm bell crank being attached to said gauge wheel upper parallel arm, such that said gauge wheel link is in compression when a front of the at least one frame section is raised using said at least one front gauge wheel.

15. The lift and gauge wheel lift mechanism of claim 11, wherein:

said lift mechanism rocker link having an upper middle pivot, a lower middle pivot, an upmost pivot, and a lowest pivot;

said lift mechanism rocker link being pivotally connected to the at least one frame section at said lower middle pivot;

said hydraulic lift cylinder being pivotally connected to said lift mechanism rocker link at said upper middle pivot;

said rear lift wheel link being pivotally connected to said lift mechanism rocker link at said upmost pivot; and said gauge wheel link being pivotally connected to said lift mechanism rocker link at said lowest pivot.

16. The lift and gauge wheel lift mechanism of claim 11, wherein:

said rear lift wheel arm being pivotally connected to the at least one frame section by way of a rockshaft.

17. The lift and gauge wheel lift mechanism of claim 16, further comprising:

a second hydraulic lift cylinder pivotally connected to a second lift mechanism rocker link, said second lift mechanism rocker link and said second hydraulic lift cylinder each being pivotally connected to the at least one frame section;

a second rear lift wheel link pivotally connected to said second lift mechanism rocker link, said second rear lift wheel link being pivotally connected to at least one of a second rear lift wheel arm and a second rear lift wheel bell crank attached to said second rear lift wheel arm;

at least one second rear lift wheel attached to said second rear lift wheel arm, said second rear lift wheel arm being pivotally connected to the at least one frame section by way of said rockshaft, said rockshaft coordinating the motion of said at least one rear lift wheel arm and said at least one second rear lift wheel arm;

a second gauge wheel link pivotally connected to said second lift mechanism rocker link, said second gauge wheel link being pivotally connected to a second gauge wheel parallel arm bell crank;

a second gauge wheel upper parallel arm and a second gauge wheel lower parallel arm, said second gauge wheel parallel arm bell crank being attached to at least one of said second gauge wheel upper parallel arm and said second gauge wheel lower parallel arm; and at least one second front gauge wheel connected to said second gauge wheel upper parallel arm and to said second gauge wheel lower parallel arm.

18. The lift and gauge wheel lift mechanism of claim 11, wherein:

at least one of said rear lift wheel link and said gauge wheel link includes a turnbuckle.

19. The lift and gauge wheel lift mechanism of claim 18, further comprising:

a locking device engageable with said turnbuckle.

* * * * *